United States Patent [19]

Nishitani et al.

[11] Patent Number: 4,899,301

[45] Date of Patent: Feb. 6, 1990

[54] SIGNAL PROCESSOR FOR RAPIDLY CALCULATING A PREDETERMINED CALCULATION A PLURALITY OF TIMES TO TYPICALLY CARRYING OUT FFT OR INVERSE FFT

[75] Inventors: Takao Nishitani; Yuichi Kawakami; Hideo Tanaka; Ichiro Kuroda, all of Tokyo, Japan

[73] Assignee: NEC Corporation, Tokyo, Japan

[21] Appl. No.: 8,684

[22] Filed: Jan. 29, 1987

[30] Foreign Application Priority Data

Jan. 30, 1986 [JP] Japan .................... 61-16697

[51] Int. Cl.$^4$ .................... G06F 7/34; G06F 15/35
[52] U.S. Cl. .................... 364/726
[58] Field of Search .................... 364/726, 736

[56] References Cited

U.S. PATENT DOCUMENTS

| | | | |
|---|---|---|---|
| 4,138,730 | 2/1979 | Ali | 364/726 |
| 4,158,888 | 6/1979 | Shapiro et al. | 364/726 |
| 4,266,279 | 5/1981 | Hines | 364/726 |
| 4,477,878 | 10/1984 | Cope | 364/726 |
| 4,541,048 | 9/1985 | Propster et al. | 364/736 |
| 4,587,626 | 5/1986 | Gray | 364/726 |
| 4,641,260 | 2/1987 | Fukukita | 364/726 |

OTHER PUBLICATIONS

Trivedi et al, "Measured Performance of Block Floating Point Hardware FFT Processor for Real-Time Speech Transform Coding", *IEE Proc.*, vol. 128, PtF, #1, pp. 54–60, Feb. 1981.

WE® DSP16 Digital Signal Processor, Preliminary Data Sheet by AT&T, 9/4/86.
NEC μPD77230 Advanced Signal Processor, Mar. 1986, pp. 5-101-5-116.
DSP56000 Digital Signal Processor User's Manual, Motorola Inc., 1986, pp. 3-1-3-17.

*Primary Examiner*—Gary V. Harkcom
*Assistant Examiner*—Dale M. Shaw
*Attorney, Agent, or Firm*—Foley & Lardner, Schwartz, Jeffery, Schwaab, Mack, Blumenthal & Evans

[57] ABSTRACT

In a signal processor for processing zeroth through $(N-1)$-th input signal elements into zeroth through $(N-1)$-th output signal elements, the input elements are initially stored, as memorized data, in respective memory addresses of a memory arrangement (11, 12) by a memory accessing arrangement which comprises a first address calculating arrangement (311, 321) for calculating a first address for the memory addresses. A distance indicating arrangement (312, 322) is for indicating an address distance from the first address among the memory addresses. By using the first address and the address distance a second address is calculated by a second address calculating arrangement (313, 323). A pair of stored data are read from the first and the second addresses as a pair of read data. A calculation performing circuit (20) is for performing a predetermined calculation on the pair of read data by using a coefficient read from a read-only memory (14) to produce a pair of calculated data which are stored in the first and the second addresses as the stored data. The calculation performing circuit performs the predetermined calculation a plurality of times to produce the output elements.

5 Claims, 6 Drawing Sheets

SIGNAL PROCESSOR FOR RAPIDLY CALCULATING A PREDETERMINED CALCULATION A PLURALITY OF TIMES TO TYPICALLY CARRYING OUT FFT OR INVERSE FFT

BACKGROUND OF THE INVENTION:

This invention relates to a signal processor for use in carrying out real-time digital signal processing, such as fast Fourier transform. The signal processor can be used as a digital filter.

In general, the real-time digital signal processing can accomplish a high reliability and a high stability in comparison with analog signal processing and realizes a filter and a modem which have a high reliability and a high stability. In addition, the real-time digital signal processing enables a time-varying adaptive filter which can not be expected in the analog signal processing.

However, the real-time digital signal processing is disadvantageous in that it is necessary to carry out a great deal of computation. More specifically, an analog input signal is sampled into samples. Each sample is converted into sampled digital data. The real-time digital processing must be carried out for the sampled digital data during every sampling interval. By way of example, let a fourth-order recursive digital filter be used in processing a telephonic audio signal at sampling rate of 8 kHz. In the fourth-order recursive filter, multiplications and additions must be executed eight times during every sampling interval of 125 microseconds. In the meanwhile, a filter according to analog technique inevitably comprises analog circuit elements, such as resistors and capacitors, so as to be reduced in size and to make consumption of electric power small. Accordingly, it is impossible to entirely substitute a digital signal processing technique for an analog signal processing technique unless a single-chip digital processor, namely, a microprocessor is available to carry out a great deal of computation. As is well known in the art, an advent of such a microprocessor has enabled a great deal of computation at a high speed. Such a microprocessor has been used as a signal processor for processing the digital signals.

In an article described in IEEE Journal of Solid State Circuits, Vol. SC-16, No. 4 (August 1981), pages 372 to 376, a signal processor is disclosed by Takao Nishitani et al. The signal processor comprises a data memory for storing data in a plurality of memory addresses, respectively, and a read-only memory for storing predetermined coefficients. A calculation performing circuit is also included in the signal processor to perform a predetermined calculation a plurality of times on the stored data read from the data memory by using the coefficients read from the read-only memory. The calculation performing circuit comprises a bit-parallel multiplier and an arithmetic and logic unit (ALU), which are connected to each other in series. The data memory is accessed by a memory accessing circuit which comprises an up/down counter and/or a register. The read-only memory is similarly accessed by a coefficient accessing circuit which comprises an up/down counter and/or a register.

Each of the up/down counters in the memory accessing circuit and the coefficient accessing circuit is effective to successively indicate stored data and the coefficients which are stored in successive addresses of the data memory and the read-only memory, respectively. In the signal processor, each of data is represented by two's complement of a binary number and is expressed by a fixed-point representation wherein a fixed point is placed between a most significant bit and a most significant bit but one. The most significant bit serves as a sign bit.

With this structure, the signal processor can be effectively used as the digital filter and, in particular, a finite impulse response (FIR) filter which carries out an arithmetic operation given by:

$$y_n = \sum_{i=1}^{n} a_i \cdot x_{n-i}, \quad (1)$$

wherein $x_n$ and $y_n$ are representative of input and output data signals produced at a time instant n, respectively, and $a_i$, coefficients. This is because the input data signals $x_n$ are stored in the successive addresses of the data memory and the coefficients $a_i$ are stored in successive addresses of the read-only memory.

On carrying out fast Fourier transform (FFT), the signal processor must process the zero-th through (N−1)-th input elements of an input data signal into the zeroth through (N−1)-th output elements of an output data signal, where N represents a predetermined positive integer. In the FFT, the stored data on which calculation should be performed are not always stored in the successive addresses of the data memory. The coefficients for the calculation are also not always stored in the successive addresses of the read-only memory. Therefore, complicated address indication must be carried out before performing the calculation.

SUMMARY OF THE INVENTION:

It is an object of this invention to provide a signal processor which can readily read stored data for calculation from a data memory without complicated address indication.

It is another object of this invention to provide a signal processor which can easily read coefficients used for calculation from a read-only memory without complicated address indication.

It is still another object of this invention to provide a signal processor of the type described, which is suitable for fast Fourier transform.

A signal processor to which this invention is applicable is for processing the zero-th through (N−1)-th input elements of an input data signal into the zeroth through (N−1)-th output elements of an output data signal, where N represents a predetermined positive integer. The signal processor includes memory means for storing data in a plurality of memory addresses, respectively, coefficient producing means for producing predetermined coefficients, and calculation performing means for performing a predetermined calculation a plurality of times on the stored data read from the memory means by using the coefficients. The calculation performing means thereby provides the output elements. According to this invention, the signal processor comprises memory accessing means which is for accessing the memory means to initially store the input elements in the respective memory addresses and which comprises first address calculating means for calculating a first address for the memory addresses, distance indicating means for indicating an address distance from the first address among the memory addresses, second address calculating means for calculating a second address by using the first address and the address distance, reading means for reading a pair of stored data from the first and the second addresses as a pair of read data, and storing means for storing a pair of calculated data in said first and the second addresses. The calculated data is obtained by once performing the predetermined calculation on the pair of read data.

DESCRIPTION OF THE PREFERRED EMBODIMENT

(Principles of the Invention)

Description will at first be directed to principles of this invention to facilitate an understanding of this invention. Herein, fast Fourier transform (FFT) alone will be exemplified although this invention is also applicable to inverse fast Fourier transform (IFFT). The fast Fourier transform (FFT) is described in detail by Alan V. Oppenheim et al in a book published by Prentice-Hall, Inc., (1975) and titled "Digital Signal Processing," on pages 290 to 320. Accordingly, the fast Fourier transform will briefly be described after description of discrete Fourier transform (DFT) which is necessary for an understanding of the fast Fourier transform (FFT).

The discrete Fourier transform (DFT) needs a lot of calculations in comparison with the fast Fourier transform (FFT) to transform the zero-th through $(N-1)$-th input elements or samples $x(i)$ of an input data signal into the zero-th through $(N-1)$-th output elements $X(k)$ of an output data signal, where N represents a predetermined positive integer. The output data signal elements $X(k)$ are interrelated with the input data signal elements $x(i)$ by:

$$X(k) = \sum_{i=0}^{N-1} x(i) \cdot \exp\{-jik(2\pi/N)\}, \quad (2)$$

where $\exp\{-jik(2\pi/N)\}$ represent coefficients which are called twiddle factors and j represents an imaginary unit.

If a base of the coefficients or the twiddle factors $\exp\{-j(2\pi/N)\}$ is represented by $W_N$, namely, if $$W_N = \exp\{-j(2\pi/N)\}, \quad (3)$$

Equation (2) is rewritten by the use of Equation (3) into:

$$X(k) = \sum_{i=0}^{N-1} x(i) \cdot W_N^{ik}. \quad (4)$$

Figure 1:
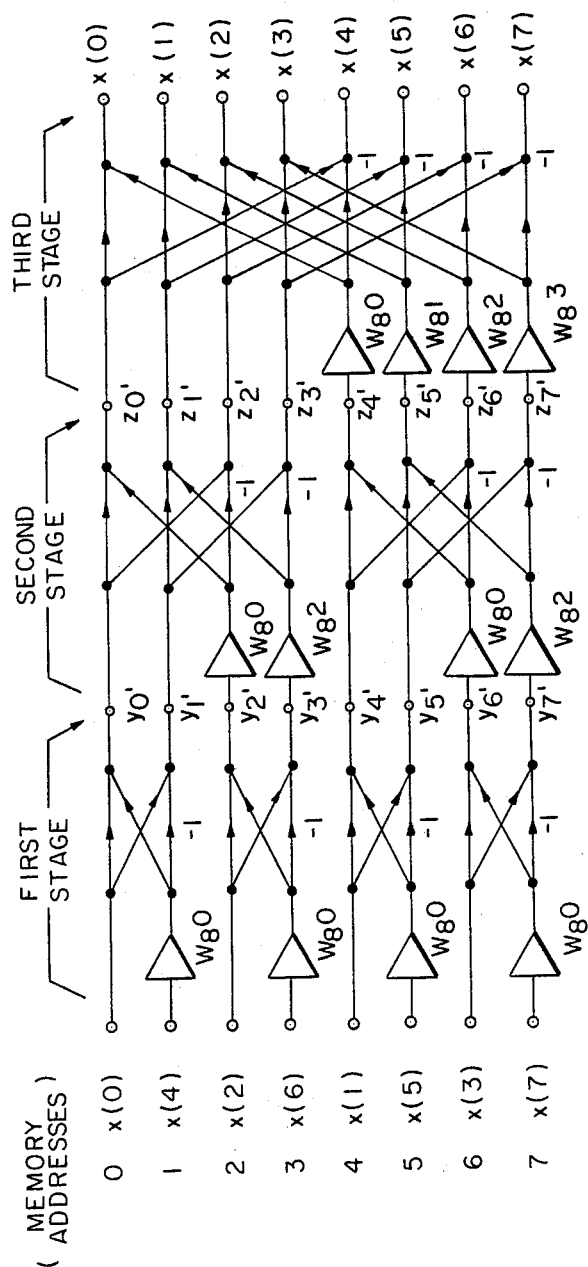
FIG. 1 shows a signal flow in an eight-point fast Fourier transform (FFT) for use in describing principles of this invention.

Referring to FIG. 1, the fast Fourier transform (FFT) will be described on the assumption that N is equal to eight. Such FFT is called eight-point FFT and can quickly calculate the zero-th through $(N-1)$-th output elements shown by Equation (4) in comparison with the discrete Fourier transform (DFT). In short, some of the twiddle factors have common values as common twiddle factors due to a symmetry and periodicity of the twiddle factors $W_N^{ik}$. The common twiddle factors are used a plurality of times in the FFT as will become clear as the description proceeds. At any rate, it may be understood as regards the FFT that each output element is given by successively summing up a product of each of the zero-th through $(N-1)$-th input elements and a twiddle factor predetermined for each input element, as will readily be understood from Equation (4). From this fact, it is seen that the FFT can be executed by the use of a data memory and a calculation circuit.

It is assumed that the zero-th through seventh input elements are successively given in the eight-point FFT and the data memory has the zero-th through seventh memory addresses. The calculation circuit stores each input element by indicating one of the memory addresses. As illustrated on the lefthand side of FIG. 1, the zero-th through seventh memory addresses are initially loaded with the zeroth, the fourth, the second, the sixth, the first, the fifth, the third and the seventh input elements $x(0)$, $x(4)$, $x(2)$, $x(6)$, $x(5)$, $x(3)$, and $x(7)$, respectively. Herein, the zero-th through seventh memory addresses are assumed to be represented by three bits arranged in a normal bit order. As a result, the zero-th through seventh memory addresses are represented by (000), (001), (010), (011), (100), (101), (110), and (111), respectively. In this situation, the above-mentioned loading of the input elements is accomplished by rearranging each memory address of the normal bit order into a rearranged memory address of a bit-reversed order. Such rearrangement is possible by a wiring or connection between the data memory and the calculation circuit. As a result, the zero-th through seventh memory addresses are rearranged into (000), (100), (010), (110), (001), (101), (011), and (111), respectively.

Thus, the zero-th through seventh input elements $x(0)$ to $x(7)$ are successively stored as stored data in the data memory with the zero-th, the fourth, the second, the sixth, the first, the fifth, the third, and the seventh memory addresses assigned thereto, respectively.

After storage of the input elements into the first through seventh memory addresses, the input elements are processed through first through third stages of computation each of which is for carrying out a plurality of times a predetermined calculation which is called a butterfly calculation.

In the first stage, the butterfly calculations are carried out four times by specifying two consecutive ones of the zero-th through seventh memory addresses. The resultant butterfly calculations are made in connection with the zeroth and the fourth input elements $x(0)$ and $x(4)$, the second and the sixth input elements $x(2)$ and $x(6)$, the first and the fifth input elements $x(1)$ and $x(5)$, and the third and the seventh input elements $x(3)$ and $x(7)$ in relation to a first common one ($W_8^0$) of the twiddle factors. As a result of the butterfly calculations, result signals in pairs ($y_0'$ and $y_1'$; $y_2'$ and $y_3'$; $y_4'$ and $y_5'$; and $y_6'$ and $y_7'$) are produced by the calculation circuit and stored as the stored data in the data memory again. Practically, each of the input elements, the output elements, and the stored data is given by a complex representation.

Figure 2:
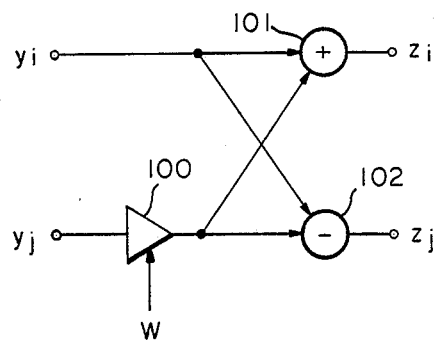
FIG. 2 shows a signal flow in a butterfly calculation in the eight-point FET illustrated in FIG. 1.

Referring to FIG. 2, description will be directed to a general butterfly calculation. In FIG. 2, it is assumed that the butterfly calculation is carried out in response to a pair of complex input data (depicted at $y_i$ and $y_j$) to produce a pair of complex output data depicted at $z_i$ and $z_j$). The complex input data $y_i$ and $y_j$ will be called first and second complex input data, respectively, while the complex output data $z_i$ and $z_j$, first and second complex output data, respectively. The memory addresses for the first and the second complex input data will be generally referred to as first and second addresses, respectively, which are common to the respective butterfly calculations.

$$z_i = y_i + W y_j$$

and $$z_j = y_i - W y_j, \quad (5)$$

where W represents the twiddle factor (suffixes omitted).

As shown in FIG. 2, a complex-number multiplier 100 multiplies the second complex input data $y_j$ by the twiddle factor W to produce a complex product data $Wy_j$. A complex-number adder 101 adds the complex product data $Wy_j$ and the first complex input data $y_i$ into the first complex output data $z_i$. A complex-number subtracter 102 subtracts the complex product data $Wy_j$ from the second complex input data $y_i$ to produce the second complex output data $z_j$.

Each of the complex input data $y_i$ and $y_j$ and the complex output data $z_i$ and $z_j$ is divisible into a real part and an imaginary part. The real parts of the complex input data $y_i$ and $y_j$ are indicated at $Re\{y_i\}$ and $Re\{y_j\}$, respectively, and the imaginary parts thereof are indicated at $Im\{y_i\}$ and $Im\{y_j\}$, respectively. Similarly, the real parts of the complex output data $z_i$ and $z_j$ are indicated at $Re\{z_i\}$ and $Re\{z_j\}$, respectively, and the imaginary parts thereof are indicated at $Im\{z_i\}$ and $Im\{z_j\}$, respectively. Since the twiddle factor W is also divisible into a real part $Re\{W\}$ and an imaginary part $Im\{W\}$, Equation (5) is rewritten into:

$$Re\{z_i\} = Re\{y_i\} + Re\{W\}Re\{y_j\} - Im\{W\}Im\{y_j\}$$

$$Im\{z_i\} = Im\{y_i\} + Re\{W\}Im\{y_j\} + Im\{W\}Re\{y_j\}$$

$$Re\{z_j\} = Re\{y_i\} - Re\{W\}Re\{y_j\} + Im\{W\}Im\{y_j\}$$

$$Im\{z_j\} = Im\{y_i\} - Re\{W\}Im\{y_j\} - Im\{W\}Re\{y_j\} \quad (6)$$

For brevity of description, the FFT will be described by using Equation (5) instead of Equation (6) for a while.

Referring back to FIG. 1, the input elements are processed in the first stage in the manner described before. Namely, the input elements are stored as the stored data the memory addresses of the data memory in the above-mentioned manner and are dealt with in pairs to produce the result signal pairs $y_0'$ and $y_1'$; $y_2'$ and $y_3'$; $y_4'$ and $y_5'$; and $y_6'$ and $y_7'$ which are stored in the data memory as the stored data pairs, respectively. Each of the result signals $y_0'$, $y_2'$, $y_4'$, and $y_6'$ are given on each butterfly calculation as the first complex input data while the remaining result signals are given as the second complex input data.

In the second stage, first and second ones of the butterfly calculations are made about the stored data pair $y_0'$ and $y_2'$ stored in the zero-th and the second memory addresses and about the stored data pair $y_1'$ and $y_3'$ stored in the first and the third memory addresses. Thus, each address distance between the zeroth and the second memory addresses and between the first and the third memory addresses is equal to two ($=2^1$) while an additional address distance between the zeroth and the first memory addresses for $y_0'$ and $y_1'$ is equal to unity.

Figure 3:
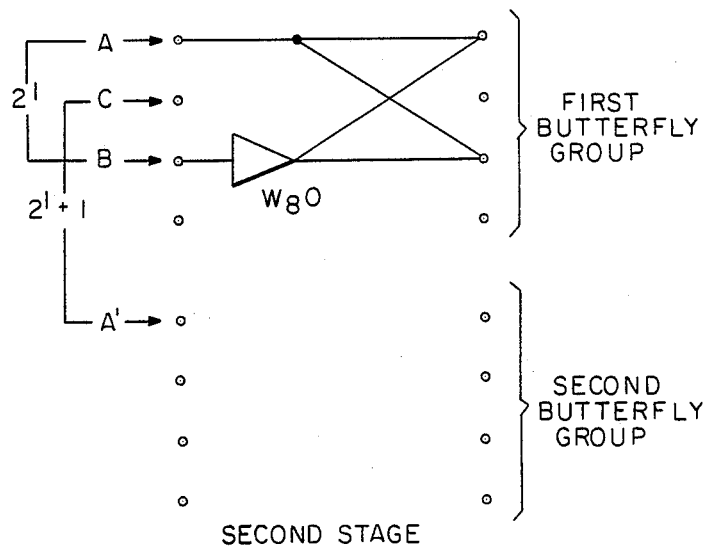
FIG. 3 shows a first butterfly of a first butterfly group in a second stage of the eight-point FFT illustrated in FIG. 1.

In FIG. 3, portions for the first and the second butterfly calculations look like butterflies and will therefore be simply referred to as first and second butterflies, respectively. The first and the second butterflies will be collectively called a first butterfly group.

In addition, third and fourth ones of the butterfly calculations are made about $y_4'$ and $y_6'$ stored in the fourth and the sixth memory addresses and about $y_5'$ and $y_7'$ stored in the fifth and the seventh memory addresses, respectively. Each address distance between the fourth and the sixth memory addresses and between the fifth and the seventh memory addresses is equal to two while an additional address distance between the fourth and the fifth memory addresses is equal to unity. The address distance of two and unity may be generally represented by $2^M$, where M is zero or a positive integer. Portions for the third and the fourth butterfly calculations may be called third and fourth butterflies which are collectively named a second butterfly group.

In the first stage also, four butterfly groups may be defined to specify the butterfly calculations in the first stage. Each group in the first stage has an address distance equal to unity.

For generality of description, the second butterfly will be referred to as a last butterfly of a preceding butterfly group while the third butterfly will be referred to as a first butterfly of a following butterfly group. A group address distance between the first and the second butterfly groups may be specified by an address distance between the memory addresses assigned to the stored data used in the second and the third butterflies, namely, in the last and the first butterflies.

In the example being illustrated, the group address distance is specified by the address distance between the first and the fourth memory addresses and is therefore equal to three.

Temporarily referring to FIG. 3, description will be made about address indication for carrying out the butterfly calculations in the second stage. In FIG. 3, the first butterfly alone is shown for simplicity of illustration with the remaining butterflies omitted from FIG. 3. The zero-th and the third memory addresses for the first butterfly are depicted at A and B, respectively, while the first memory address for the second butterfly and the fourth memory address for the third butterfly are depicted at C and A', respectively.

In the first butterfly, the address distance between the zero-th and the second memory addresses for $y_0'$ and $y_2'$ is equal to two, namely, $2^1$ as mentioned before. The address distance of $2^1$ is kept unchanged in the second, the third, and the fourth butterflies. The first memory address C for the second butterfly can be indicated by incrementing the zero-th memory address by unity. Likewise, the fourth memory address A' can be specified by adding three ($=2^1+1$) to the first memory address C.

Such address indication is accomplished by the use of an adder circuit and two register circuits which can be counted up one by one. A first one of the two register circuits may be called an index register I for storing a first address which is for storing the first complex input data $y_i$. On the other hand, a second one of the two register circuits may be called a base register B for storing the address distance between the addresses for the first and the second complex input data.

Address calculation for the first butterfly group is carried out in response to the first address for the first complex input data $y_i$ and the address distance to produce the second address in which the second complex input data are stored. Such an address calculation is possible by the use of the adder circuit for adding the address distance to the first address, namely, zeroth memory address. As a result, the second memory address is indicated as the second address. Thereafter, the first butterfly calculation is made with reference to the twiddle factor $W_8^0$ about the stored data stored in the zeroth and the second memory addresses.

Subsequently, a content of the index register is changed from the zero-th memory address to the first memory address which may be produced as the first address. In this event, the address distance of $2^1$ is stored in the base register without being changed. The address distance is added to the first memory address in the above-mentioned manner to calculate the second address necessary for the second butterfly calculation. As a result, the third memory address is indicated as the second address to carry out the second butterfly calculation of the first butterfly group with reference to an additional one $W_8^2$ of the twiddle factors. Thus, the first and the second butterfly calculations of the first butterfly group are completed and followed by the third and the fourth butterfly calculations of the second butterfly group. When operation proceeds from the first butterfly group to the second one, the group address distance of 3 is added to the first memory address which is used as the first address in the second or last butterfly calculation of the first butterfly group. Such a group address distance of 3 can be calculated by adding the address distance of 2 to the first memory address and by incrementing a result of the addition by unity.

The addition of the group address distance to the first memory address indicates the fourth memory address as the first address for the third butterfly calculation of the second butterfly group. Thereafter, the address distance is added to the fourth memory address to indicate the sixth memory address which is used as the second address. The third butterfly calculation is carried out with reference to the twiddle factor $W_8^0$ in a manner similar to that of the first and the second butterfly calculations.

A similar address calculation is made on carrying out the fourth butterfly calculation with reference to the additional twiddle factor $W_8^2$. Thus, processing is finished as regards the second stage of computation. Anyway, the first and second complex output data $z_i$ and $z_j$ are produced in pair as those results of the first through fourth butterfly calculations which are depicted at $z_0'$, $z_1'$, ..., $z_7'$ in FIG. 1 and which are stored in the zero-th through seventh memory addresses, respectively.

The second stage is followed by the third stage wherein four butterfly calculations are carried out in relation to two selected ones of $z_0'$ through $z_7'$ and will be called first through fourth additional butterfly calculations, respectively. In the first additional butterfly calculation, the zero-th and the fourth memory addresses are indicated as the first and the second addresses, respectively. Likewise, the first and the fifth memory addresses, the second and the sixth memory addresses, and the third and the seventh memory addresses are indicated in the second through fourth additional butterfly calculation, respectively. Thus, each address distance in the first through fourth additional butterfly calculations is equal to four, namely, $2^2$. Therefore, butterflies for the first through fourth additional butterfly calculation may be collectively called a butterfly group.

The above-mentioned address indication can be carried out by storing the address distance of $2^2$ in the base register in a manner similar to that described in conjunction with the second stage. More specifically, the index register is loaded with the zero-th memory address in the first additional butterfly calculation and is successively counted up by one at each of the second through fourth additional butterfly calculations. Each content of the index register is added to the address distance stored in the base register, to calculate the second address.

Results of the first through fourth additional butterfly calculations are produced in the form of the zero-th and the fourth output elements X(0) and X(4), the first and the fifth output elements X(1) and X(5), the second and the sixth output elements X(2) and X(6), and the third and the seventh output elements X(3) and X(7), respectively.

The first and the second addresses for the plurality of butterfly calculations in each stage can be produced in a memory accessing arrangement which is separated from the calculation circuit and which will be described in detail later. This means that the first and the second addresses may not be given from the calculation circuit at every butterfly calculation and that the butterfly calculations are quickly carried out in each stage.

Herein, consideration must be made about the twiddle factor which is selected from a group consisting of $W_8^0$, $W_8^1$, $W_8^2$, and $W_8^3$ as shown in FIG. 1. Each superscript attached to the twiddle factors is made to correspond to a factor address in a read-only memory different from the data memory. Therefore, the zero-th through third ones of the factor addresses are loaded with the twiddle factors $W_8^0$, $W_8^1$, $W_8^2$, and $W_8^3$, respectively.

As readily understood from Equation (3), a difference W′ between two consecutive ones of the twiddle factors is equal to $\exp(-j2\pi/8)$ and may be recognized as $W^{2^0}$, namely, W′ to the $2^0$-th or first power. This shows that a difference between the twiddle factors $W_8^0$ and $W_8^2$ is equal to $\exp(-j4\pi/8)$ which are recognized as $W^{2^1}$, namely, W′ to the $2^1$-th or second power.

In FIG. 1, only the twiddle factor $W_8^0$ is used in the first stage. This shows that the zero-th factor address alone is indicated in the read-only memory during the first stage.

In the second stage, the twiddle factor $W_8^0$ and the additional twiddle factors $W_8^2$ are used to carry out the first through fourth butterfly calculations and are stored in the zeroth and the second factor addresses. The resultant twiddle factors are changed between $W_8^0$ and $W_8^2$ at every butterfly calculation. In other words, the additional twiddle factor $W_8^2$ is increased relative to the twiddle factor by W′ to the $2^1$-th power.

In the third stage, the twiddle factors $W_8^0$ to $W_8^3$ are successively increased at every butterfly calculation by W' to the first power. For this purpose, the zero-th through third factor addresses are successively accessed to produce the twiddle factors $W_8^0$ to $W_8^3$ in the first through fourth additional butterfly calculations, respectively.

It is possible to specify each of the zero-th through third factor addresses by the use of a counter and a register which are internally located in the signal processor and which cooperates with the read-only memory. In fact, each of the twiddle factors $W_8^0$ to $W_8^3$ has the real and the imaginary parts as mentioned before. The real and the imaginary parts may be individually stored in different addresses as will later become clear.

Figure 4:
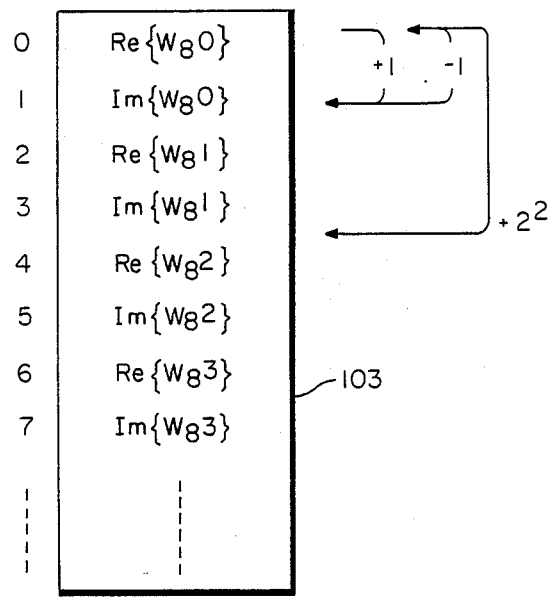
FIG. 4 shows contents of a read-only memory for use in this invention.

Referring now to FIG. 4, the twiddle factors are read out of the read-only memory be accessing the read-only memory by a register having contents which are countable up and down by 1 and which are countable up by $2^{L+1}$, where L is zero or a positive integer in the manner to be later described.

In FIG. 4, the read-only memory is depicted at 103 and is for storing the twiddle factors in a plurality of factor addresses, respectively. The factor addresses are divided into even-numbered factor addresses 2K and odd-numbered factor addresses (2K+1), where K represents zero or a positive integer and is different from k. When the twiddle factors are represented by $W_N^K$, real parts and imaginary parts of the twiddle factors $W_N^K$ are represented by $Re\{W_N^K\}$ and $Im\{W_N^K\}$, respectively. The real parts $Re\{W_N^K\}$ are stored in the even-numbered coefficient addresses 2K while the imaginary parts $Im\{W_N^K\}$ are stored in the odd-numbered coefficient addresses (2K+1).

In order to access the read-only memory 103, it is preferable to use the register which can be counted up or down by 1. The reason will be described hereinunder. A product of the complex input data $y_j$ by the twiddle factor (depicted at $W_N^m$, where m is zero or a positive integer) is given by:

$$W_N^m \cdot y_j = \quad (7)$$
$$[Re\{W_N^m\} + jIm\{W_N^m\}] \cdot [Re\{y_j\} + jIm\{y_j\}] =$$
$$[Re\{y_j\}Re\{W_N^m\} - Im\{y_j\}Im\{W_N^m\} +$$
$$jRe\{y_j\}Im\{W_N^m\} + jIm\{y_j\}Re\{W_N^m\}]$$

On calculating Equation (7), the twiddle factors $W_N^m$ must be produced in the order to $Re\{W_N^m\}$, $Im\{W_N^m\}$, $Im\{W_N^m\}$, and $Re\{W_N^m\}$. The register must be incremented by 1 so as to read $Im\{W_N^m\}$ out of the read-only memory after readout of $Re\{W_N^m\}$. On the other hand, the register must be decremented by 1 on production of $Re\{W_N^m\}$ after readout of $Im\{W_N^m\}$.

In each of the second and the third stages illustrated in FIG. 1, let the butterfly calculation be changed to the following butterfly calculation in the same butterfly group. In this case, the register must be incremented by $2^{L+1}$. This is because the factor address for the following butterfly calculation is divided into two addresses and is spaced part from the preceding factor address for the preceding butterfly calculation by two to the $2^L$-th power at a time.

In the interim, let the butterfly calculation be carried out in accordance with Equations (5). Since Equation (5) is rewritten into Equations (6), the real and the imaginary parts of the complex output data $z_i$ and $z_j$ can be calculated by summing up three terms in accordance with Equations (6).

In order to calculate the complex output data $z_i$ and $z_j$ with high precision, occurrence of an overflow and a rounding error should be avoided during calculation. For this purpose, a double precision bit length is rounded into a single precision bit length. More particularly, each result of multiplication which might occur on calculation of Equations (6) generally has the double precision bit length arranged from the most significant bit to the least significant bit. The real and the imaginary parts of each of the complex input data are processed in the form of the double precision bit length, as will later be described. The result of multiplication and the real and the imaginary parts of the complex input data (which may be called pre-shifted signals) are shifted towards the least significant bit by two bits into shifted output signals. In Equations (6), three shifted output signals are summed up into a sum signal. The sum signal is shifted towards the most significant bit by one bit into a shifted sum signal having the double precision bit length. The shifted sum signal is rounded into the single precision bit length.

Since the result of multiplication and the real and the imaginary parts of the complex input data, namely, the pre-shifted signals, are shifted towards the least significant bit by two bits, as mentioned above, each of the shifted output signals indicates a value which is equal to a quarter of that of the pre-shifted signals. Under the circumstances, the overflow never occurs in the course of calculation, despite summation of three shifted output signals. The sum signal may or not may be twice the pre-shifted signals because an absolute value of each twiddle factor is equal to 1. Although two-bit shift of the sum signal towards the most significant bit might gives rise to overflow, a single bit shift of the sum signal towards the most significant bit never brings about overflow.

In consequence of the single bit shift, a dynamic range is reduced to a half of the dynamic range in each butterfly calculation. This reduction of the dynamic range is algorithmically insured. Equation (2) of the DFT is divided by N into:

$$X(k) = \frac{1}{N} \sum_{i=0}^{N-1} x(i) \cdot \exp\{-jik(2\pi/N)\}, \quad (8)$$

The double precision bit length is rounded into the single precision bit length after the single bit shift towards the most significant bit. In other words, such rounding operation is carried out after each butterfly calculation. The result of calculation therefore can be calculated with a high precision.

(Embodiment)

Figure 5:
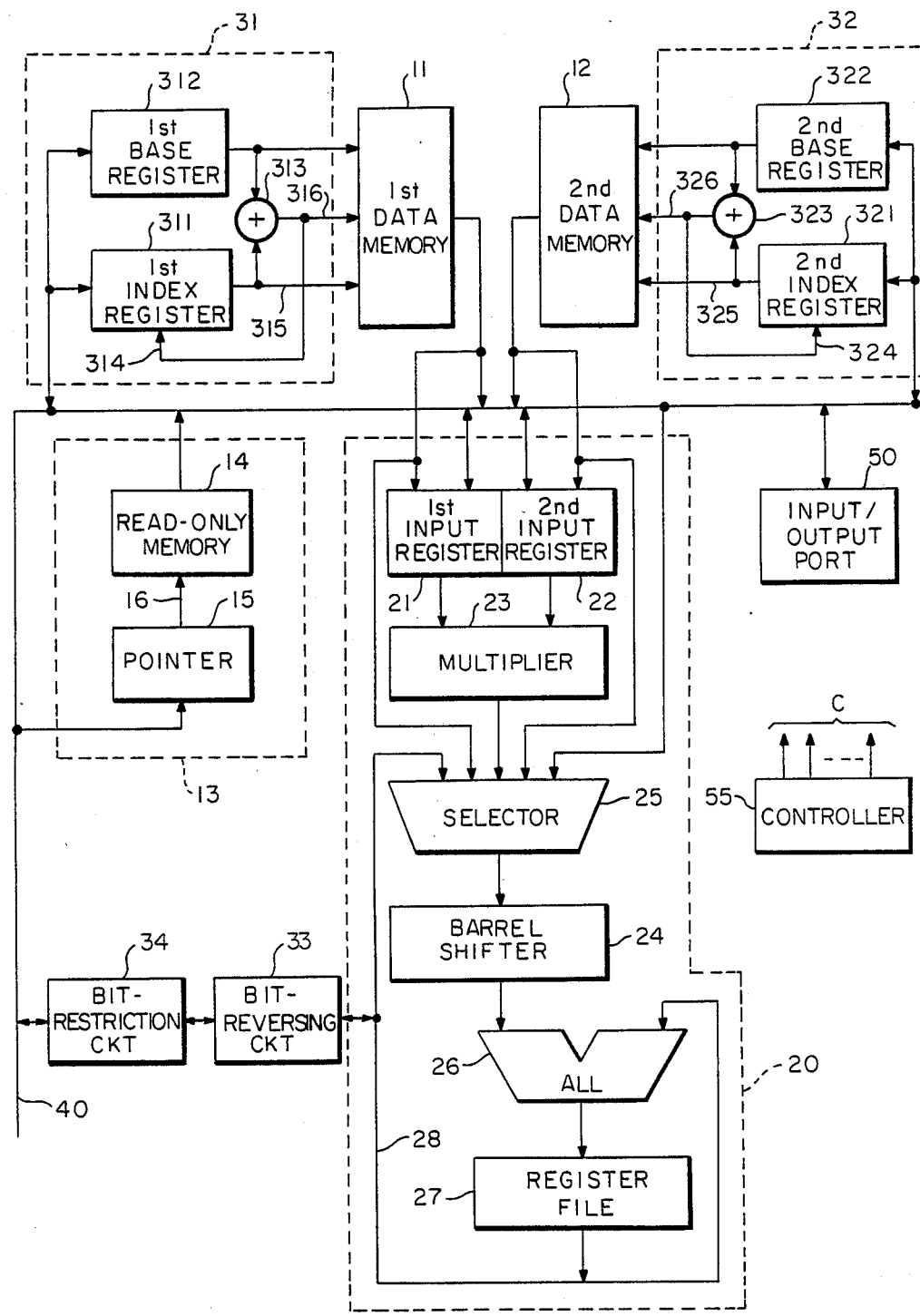
FIG. 5 is a block diagram of a signal processor according to an embodiment of this invention.

Referring to FIG. 5, a signal processor according to a preferred embodiment of this invention is for processing zeroth through (N−1)-th input elements x(0) through x(N−1) of an input data signal into zero-th through (N−1)-th output elements X(0) through X(N−1) of an output data signal. In this embodiment, N is assumed to be equal to eight. As mentioned before, each of the input and the output elements is divisible into a real and an imaginary part. The zeroth through the (N−1)-th output elements X(0) to X(N−1) are related to the zeroth through the (N−1)-th input elements x(0) through x(N−1) by:

$$X(k) = \frac{1}{N} \sum_{i=0}^{N-1} x(i) \cdot W_N^{ik}.$$

The signal processor comprises a memory arrangement for memorizing the memorized data in a plurality of memory addresses, respectively. As mentioned before, the stored data comprise a real part and an imaginary part each of which has the single precision bit length. The memory arrangement comprises a first data memory 11 and a second data memory 12. The first data memory 11 is for memorizing the real parts of the stored data while the second data memory 12 is for storing the imaginary parts of the stored data. Each of the first and the second data memory 11 and 12 may be an integrated circuit described in 1982 CATALOG, pages 75-78 published 1982 by NEC Electronics U.S.A. Incorporated.

A coefficient producing arrangement 13 is for producing predetermined coefficient, namely, the twiddle factors. The coefficient producing arrangement 13 comprises a read-only memory 14 which is equivalent to the read-only memory 103 shown in FIG. 4. The read-only memory 14 may be, for example, an integrated circuit described in 1982 CATALOG (pages 137 to 139), supra. The read-only memory 14 acts as a coefficient memory arrangement for memorizing the twiddle factors in a plurality of coefficient addresses, respectively. The twiddle factors are equal in number to four and divided into the real parts and the imaginary parts.

A pointer 15 is included in the coefficient producing arrangement 13 and coupled to the read-only memory 14. The pointer 15 acts as a factor address calculating arrangement for calculating the factor addresses one at a time in the manner mentioned before. When a selected one of the factor addresses is supplied to the read-only memory 14 through a line 16, either the real part or the imaginary part of one of the twiddle factors is read from the selected factor address.

A calculation performing circuit 20 is for successively performing a predetermined calculation, namely, the butterfly calculation a plurality of times on the stored data read from the first and the second data memories 11 and 12 by using the twiddle factors. The calculation performing circuit 20 thereby produces the output elements as results of the butterfly calculations.

The signal processor further comprises the memory accessing arrangement for accessing the memory arrangement to initially store the input elements in the respective memory addresses and to access the memory arrangement in a manner similar to that described in conjunction with FIG. 1. The memory accessing arrangement comprises first and second memory accessing circuits 31 and 32. The first memory accessing circuit 31 is for accessing the first data memory 11 to initially store the real parts of the input elements. The second memory accessing circuit 32 is for accessing the second data memory 12 to initially store the imaginary parts of the input elements. Such initial operation will later be described in detail.

The first memory accessing circuit 31 comprises a first index register 311. The first index register 311 acts as a first address calculating arrangement for calculating the first address for the butterfly calculation to specify one of the memory addresses of the first data memory 11. The first address will be referred to as a first real address. The first index register 311 can automatically count up its content by one.

A first base register 312 acts as a distance indicating arrangement for indicating an address distance between the first address and a second address for the butterfly calculation on the first data memory 11, as mentioned before. The second address will be called a second real address.

A first adder 313 acts as a second address calculating arrangement for calculating the second real address by using the first real address and the address distance. The second real address is delivered to the first index register 311 through a line 314. When the first and the second real addresses are supplied to the first data memory 11 through lines 315 and 316, a pair of real parts of the stored data are read from the first and the second real addresses as a pair of real parts of read data. A pair of real parts of calculated data are stored in the first and the second real addresses of the first data memory 11 through a data bus 40.

The second memory accessing circuit 32 comprises a second index register 321. The second index register 321 similarly acts as the first address calculating arrangement for calculating a first address which will be referred to as a first imaginary address for specifying the memory addresses of the second data memory 12. The second index register 311 can be counted up one by one. A second base register 322 similarly acts as a distance indicating arrangement for indicating the address distance between the first address and a second address which will be called a second imaginary address and which is necessary for the butterfly calculation. A second adder 323 acts as another second address calculating arrangement for calculating the second imaginary address by using the first imaginary address and the address distance. The second imaginary address is delivered to the second index register 321 through a line 324. When the first and the second imaginary addresses are supplied to the second data memory 12 through lines 325 and 326, a pair of imaginary parts of the stored data are read from the first and the second imaginary addresses as a pair of imaginary parts of read data. A pair of imaginary parts of calculated data are stored in the first and the second imaginary addresses of the second data memory 12 through the data bus 40.

Each of the first and the second base registers 312 and 322 may be an integrated circuit described in "ALS/AS Logic Circuits Data Book," pages 4-321 to 4-326 published in 1985 by Texas Instruments Incorporated, Texas. Each of the first and the second index register 311 and 321 may be an integrated circuit described in "ALS/AS Logic Circuit Data Book" (pages 4-139 to 4-148), supra. Each of the first and the second adder 313 and 323 may be an integrated circuit described in "ALS/AS Logic Circuits Data Book" (pages 4-175 to 4-185), supra.

The calculation performing circuit 20 comprises a first input register 21 coupled to the data bus 40 and the first data memory 11. The first input register 21 is for storing, as a first stored data, either a real part of the read data read from the first data memory 11 or a twiddle factor read from the read-only memory 14 through the data bus at a time. A second input register 22 is similarly coupled to the data bus 40 and the second data memory 12. The second input register 22 is for storing as a second stored data, either an imaginary part of the read data read from the second data memory 12 or a twiddle factor read from the read-only memory 14 through the data bus at a time. Each of the first and the second input register may be an integrated circuit described in "ALS/AS Logic Circuits Data Book" (pages 4-321 to 4-326), supra.

The first and the second stored data are sent to a multiplication circuit or multiplier 23 which produces a multiplier output signal. The multiplier 23 may be an integrated circuit described in "Schottky and Low-power Schottky Data Book Including Digital Signal Processing Handbook, pages 4-3 to 4-8, published 1977 by advanced Micro Devices, Inc., California.

The multiplier output signal is sent to a barrel shifter 24 through a selector 25. The barrel shifter 24 may be an integrated circuit described in "Schottky and Low-power Schottky Data Book Including Digital Signal Processing Handbook" (pages 4-33 to 4-36), supra. The selector 25 may be an integrated circuit described in "ALS/AS Logic Circuits Data Book" (pages 4-123 to 4-126), supra. The barrel shifter 24 produces a shifted signal.

The shifted signal is sent to an arithmetic and logic unit (ALU) 26. The ALU 26 may be an integrated circuit described in "ALS/AS Logic Circuits Data Book" (pages 4-175 to 4-185), supra. The ALU 26 produces an arithmetic output signal.

The arithmetic output signal is sent to a register file 27 which comprises a plurality of registers. The register file 27 may be an integrated circuit described in "ALS-/AS Logic Circuits Data Book" (pages 4-621 to 4-625), supra. The register file 27 produces a field data. The field data is sent to the ALU 26. The filed data is further sent to the selector 25 through an operation bus 28.

The selector 25 is for selecting one of the multiplier output signals, the real part of the read data, the imaginary part of the read data, the filed data, and data produced by the data bus to produce selected data. The selected data is sent to the barrel shifter 24.

It is possible to understand that the calculation performing circuit 20 comprises a first and a second part. The first part comprises the barrel shifter 24, the selector 25, the ALU 26, the register file 27, and the operation bus 28. The second part comprises the first input register 21, the second input register 22, and the multiplier 23. The first part is for initially calculating a provisional address for each of the input elements. The first and the second parts are for performing the butterfly calculation after the input elements are stored in the respective memory addresses.

The memory accessing arrangement further comprises a bit reversing circuit 33 for bit-reversing or bit-order reversing the provisional address into an input address of the memory addresses. The input address is sent to the first and the second index registers 311 and 321 through a bit-restriction circuit 34 which will later be described in detail and the data bus 40. Therefore, each of the input elements is stored in the input address before the first and the second parts are used in performing the butterfly calculation.

An input/output part 50 is for inputting the input elements and for outputting the output elements. The input/output port 50 may be an integrated circuit described in "Schottky and Low-power Schottky Data Book Including Digital Signal Processing Handbook" (pages 4-123 to 4-129), supra. In addition, the signal processor further comprises a controller 55 for producing various kinds of control signals which are collectively shown at CONT and which will become clear as the description proceeds.

Description will be made about operation of the signal processor illustrated in FIG. 5. It is assumed that the FFT is carried out by the illustrated signal processor and that the signal processor can access a maximum data number of $2^n$. Herein, let n be equal to ten. In this event, the stored data can be specified by an address signal of n bits, namely, ten bits.

The butterfly calculations are successively made for the FFT in the manner illustrated in FIG. 1. It is also assumed that the number N of each of the input elements and the output elements is equal to eight. Therefore, the input elements may be numbered from the zeroth input element x(0) to the seventh input element x(7). Likewise, the output elements are numbered from the zero-th output element X(0) to the seventh output element X(7).

The zero-th through seventh input elements x(0) to x(7) should be stored in each of the first and the second data memories 11 and 12 in the manner illustrated in FIG. 1. As described before, each input element x(0) to x(7) is divisible into the real and the imaginary parts. In the example being illustrated, the real part of each input element is stored in the first data memory 11 in the first place and thereafter the imaginary part of each input element is stored in the second data memory 12. For storage of each input element, a bit-reversed address signal must be given to the first and the second data memories 11 and 12. To this end, the arithmetic and logic unit 26 (FIG. 5) is supplied with the address signal of 10 bits from the register file 27 through the selector 25 and the barrel shifter 24. Each address signal has the double precision bit length, namely, 20 bits, as will become clear later. However, only the ten lower significant bits of 20 bits are meaningful. Consideration may therefore be made about the ten lower significant bits for a while. The register file 27 comprises a first and a second address register which are operable in the bit-reverse mode.

At a first step of operation, the real part of the zero-th input element x(0) is supplied from the input/output port 50 to the data bus 40. Under the circumstances, the bit-reversing circuit 33 is in the bit-reverse mode and the barrel shifter 24 is set into a shift mode of giving a shift amount of zero. In addition, the bit-restriction circuit 34 is kept in a mode of selecting ten lower bits of the single precision.

The zero-th address signal is stored in the first address register of the register file 27. The second address register of the register file 27 is loaded with a predetermined number of $2^7$, namely, (0010000000) in the bit-reverse mode. The zero-th address signal is sent from the first address register to the bit-reversing circuit 33 through the operation bus 28.

Figure 6:
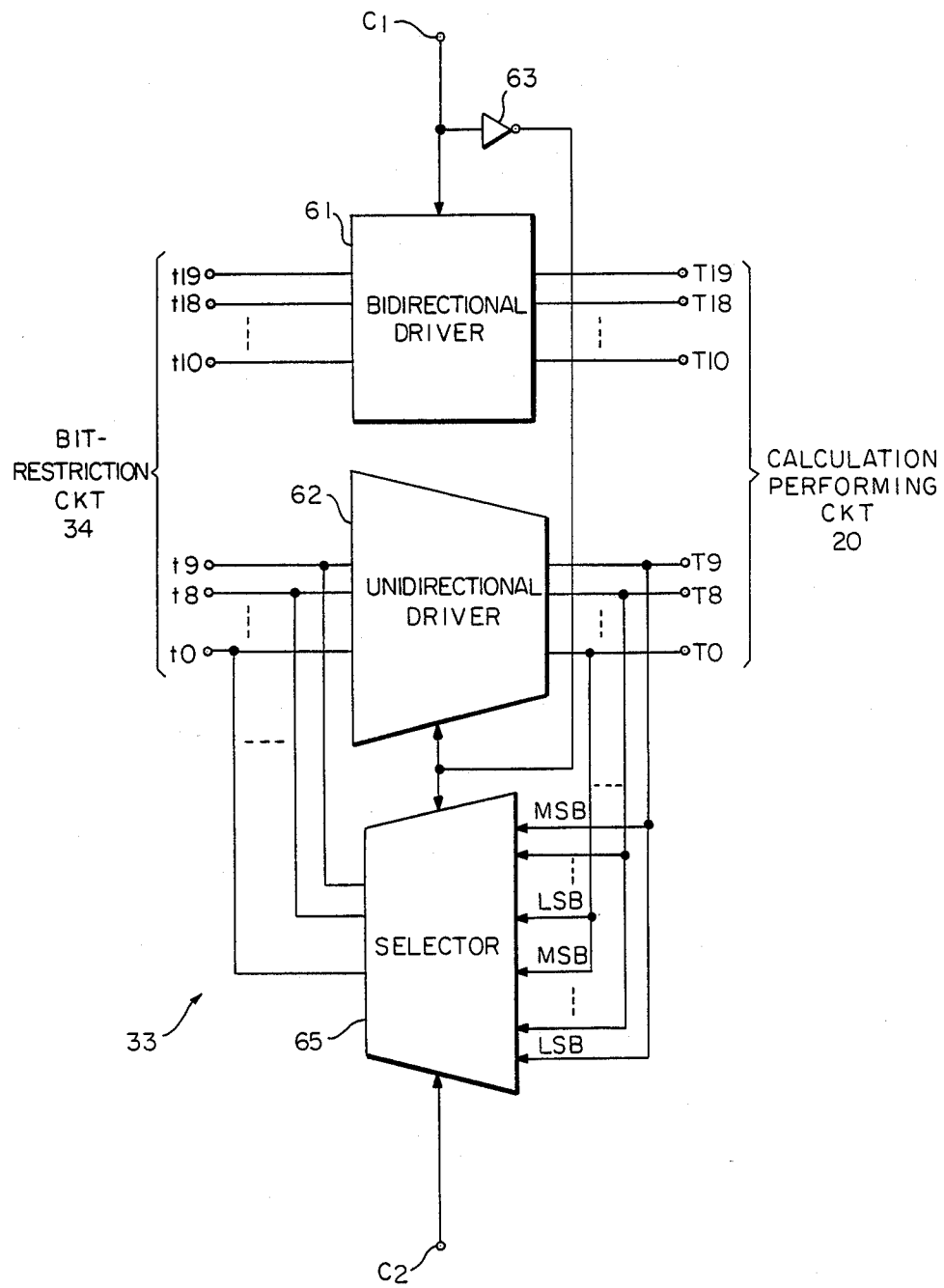
FIG. 6 is a circuit diagram of a part of the signal processor illustrated in FIG. 5.

Temporarily referring to FIG. 6, the bit-reversing circuit 33 is interposed between the calculation performing circuit 20 and the bit-restriction circuit 34 and can carry out bidirectional communication between the calculation performing circuit 20 and the bit-restriction circuit 34, although description will be mainly directed to data transfer from the calculation performing circuit 20 to the bit-restriction circuit 34.

The illustrated bit-reversing circuit 33 has a first set of zero-th through nineteenth terminals T0 to T19 connected to the calculation performing circuit 20 through the operation bus 28 and a second set of zero-th through nineteenth terminals t0 to t19 connected to the bit-restriction circuit 34. The zero-th through nineteenth terminals T0 to T19 or t0 to t19 are made to correspond to the zero-th through nineteenth significant bits of data or address signals, respectively. The upper halves T10 to T19 and t10 to t19 of the first and the second sets are connected to a bidirectional driver 61 while the lower halves T0 to T9 and t0 to t9 are connected to a unidirectional driver 62 which are operable to carry out data transfer from the bit-restriction circuit 34 to the calculation performing circuit 20, although the data transfer will not be explicitly described. Such data transfer is carried out when the first control terminal C1 is supplied with a high level signal (H) as a first one of the control signals. Each of the bidirectional driver 61 and the unidirectional driver 62 may be an integrated circuit described in "The Bipolar Digital Integrated Circuits Data Book TTL/Interface Circuits," pages 7-330 to 7-331, published 1985 by Texas Instruments Incorporated, Texas.

The bidirectional driver 61 is connected direct to the first control terminal C1 while the unidirectional driver 62 is connected through an inverter 63 to the first control terminal C1. The inverter 63 may be an integrated circuit described in "The Bipolar Digital Integrated Circuits Data Book TTL/Interface Circuits" (pages 6-2 to 6-3), supra.

A selector 65 is placed between the lower halves T0 to T9 and t0 to t9 of the first and the second sets of terminals and is connected to the second control terminal C2 directly and to the first control terminal C1 through the inverter 63. The selector 65 may be an integrated circuit described in "The Bipolar Digital Integrated Circuits Data Book TTL/Interface Circuits" (pages 7-162 to 7-166), supra. More particularly, a connection between the zero-th through ninth terminals T0 to T9 of the first set is divided into a first wiring and a second wiring. In the first wiring, the ninth through zero-th terminals T9 to T0 of the first set are connected to the selector 65 as a most significant bit terminal MSB through a least significant bit terminal LSB, respectively. In the second wiring, the ninth through zero-th terminals T0 to T9 of the first set are connected to the selector 65 as a least significant bit terminal LSB through a most significant bit terminal MSB, respectively. Therefore, the second wiring serves to rearrange the normal bit order of the data or the address signals into a bit reversed order thereof.

In FIG. 6, let the first control terminal C1 be given a low level signal as the first control signal. In this case, data transfer is made in the direction from the first set of terminals T0 to T19 to the second set of terminals t0 to t19 with the unidirectional driver 62 kept inactive. If the second control terminal C2 is given the low level signal in the above-mentioned state, the selector 65 selects the first wiring. As a result, the ninth through zero-th bits given to the ninth through zero-th terminals T9 to T0 are sent through the selector 65 to the ninth through zero-th terminals t9 to t0 of the second set without any bit reverse, respectively.

Inasmuch as the bidirectional driver 61 becomes active, the ten upper significant bits are supplied from the nineteenth through tenth terminals T19 to T10 of the first set to the nineteenth through the tenth terminals t19 to t10 of the second set, respectively, together with the ten lower significant bits. As a result, the nineteenth through zero-th significant bits are sent from the first set of terminals to the second set of terminals.

On the other hand, if the second control terminal C2 is given the high level signal, the second wiring is selected by the selector 65. Therefore, the ninth through zero-th bits given to the ninth through zero-th terminals T9 to T0 are reversed in bit order to be sent to the zero-th through ninth terminals t0 to t9, respectively. The nineteenth through tenth bits are sent from the first set of terminals T19 to T10 to the second set of terminals t19 to t10, respectively.

If the first control terminal C1 is given the high level signal, the bidirectional driver 61 and the unidirectional driver 62 becomes active with the selector 65 kept inactive. As a result, the nineteenth through zero-th bits are sent from the second set of terminals t19 to t0 to the first set of terminals T19 to T0, respectively.

Referring back to FIG. 5, the zero-th address signal is reversed in bit order into a zeroth bit-reversed address signal by the bit-reversing circuit 33 in the manner illustrated in FIG. 6. The zero-th bit-reversed address signal is equivalent to the zero-th address signal and is sent to the bit-restriction circuit 34 together with the ten upper significant bits.

Figure 7:
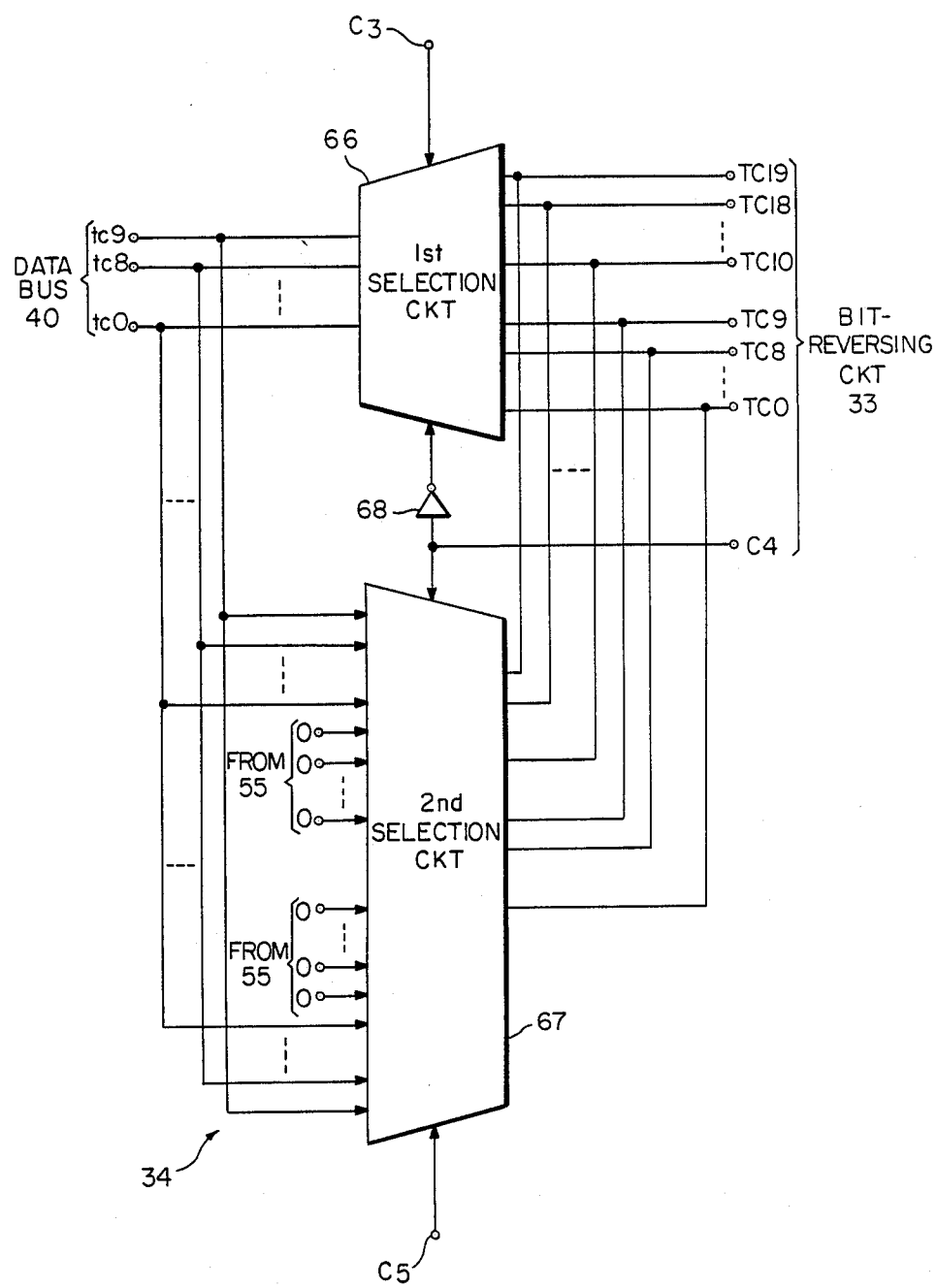
FIG. 7 is a circuit diagram of another part of the signal processor illustrated in FIG. 5.

Referring to FIG. 7, the bit-restriction circuit 34 is interposed between the bit-reversing circuit 33 and the data bus 40 and is operable to carry out bidirectional communication therebetween. The bit-restriction circuit 34 has a first set of zero-th through nineteenth connection terminals (depicted at TC0 to TC19) connected to the second set of terminals t0 to t19 (FIG. 6) of the bit-reversing circuit 33, respectively, and a second set of zero-th through ninth connection terminals tc0 to tc9 connected to the data bus 40. The bit-restriction circuit 34 has third, fourth, and fifth control terminals C3, C4, and C5 which are supplied with the control signals from the controller 55 (FIG. 5) in a manner to be described later.

The illustrated bit-restriction circuit 34 comprises a first selection circuit 66 operable on carrying out data transfer in a direction from the bit-reversing circuit 33 to the data bus 40 and a second selection circuit 67 operable on carrying out data transfer in an opposite direction from the data bus 40 to the bit-reversing circuit 33. The first and the second selection circuits 66 and 67 are therefore selectively operated in response to the control signal given through the fourth control terminal C4. In the example being illustrated, the first and the second selection circuits 66 and 67 are put into active states when the fourth control terminal C4 is given the low level signal (L) and the high level signal (H), respectively. To this end, the first selection circuit 66 is connected through an inverter circuit 68 to the fourth control terminal C4 while the second selection circuit 67 is connected direct to the fourth control terminal C4.

More particularly, the first selection circuit 66 selects either an upper half (TC19 to TC10) of the connection terminals of the first set or a lower half (TC9 to TC0) of the connection terminals of the first set in response to the control signal supplied through the third control terminal C3. In the example being illustrated, the upper half of connection terminals is selected by the first selection circuit 66 when the third control terminal C3 is given the high level signal. Otherwise, the lower half of connection terminals is selected by the first selection circuit 66.

On the other hand, the second selection circuit 67 is connected to the connection terminals tc0 to tc9 through a first additional wiring and a second additional wiring. The second selection circuit 67 is supplied with a bus data signal of 10 bits from the data bus 40 to produce a selector output signal of 20 bits. The bus data signal is arranged either in an upper half of the selector output signal or in a lower half thereof, with the remaining half of the selector output signal kept zero. The first additional wiring is for arranging the bus data signal as the upper half of the selector output signal. In this case, zero bits, ten in number, are arranged by the controller 55 as the lower half of the selector output signal. The second wiring is for arranging the bus data signal as the lower half of the selection output signal with the upper half kept zero by the controller 55.

In the illustrated example, the first additional wiring is selected by the second selection circuit 67 together with the ten zero bits arranged as the lower half of the selector output signal when the fifth control terminal C5 is given the high level signal. Otherwise, the second additional wiring is selected by the second selection circuit to arrange the ten zero bits and the bus data signal as the upper and the lower halves of the selector output signal.

Each of the first and the second selection circuits 66 and 67 may be an integrated circuit used for the selector 65 illustrated in FIG. 6.

Referring to FIG. 5 together with FIG. 7, the bit-restriction circuit 34 is supplied with the zero-th bit-reversed address signal through the zeroth to ninth connection terminals TC0 to TC9 (FIG. 7) of the first set. In this event, the third and the fourth control terminals C3 and C4 are given the low level signal (L) and the low level signal (L), respectively. Accordingly, the zero-th bit-reversed address signal is sent through the first selection circuit 66 and the data bus 40 to the first index register 311. As a result, the first index register 311 is kept at zero.

Thus, the first step proceeds to a second step of operation. At the second step, the real part Re{x(0)} of the zero-th input element x(0) is transferred from the input-/output port 50 through the data bus 40 to the first data memory 11. Inasmuch as the first data memory 11 is given the zero-th bit-reversed address signal which specifies the zero-th memory address of the first data memory 11, the real part Re{x(0)} is stored in the zero-th memory address of the first data memory 11.

The second step is followed by a third step which is related to the imaginary part Im{x(0)} of the zero-th input element x(0). In this case, the content of the first index register 311 is transferred to the second index register 321 through the data bus 40. As a result, the second index register 321 is loaded with the zero-th bit-reversed address signal specifying the zero-th memory address.

At a fourth step following the third step, the imaginary part Im{x(0)} is supplied from the input/output port 50 through the data bus 40 to the second data memory 12. As a result, the imaginary part Im{x(0)} is stored in the zero-th memory address of the second data memory 12 under control of the second index register 221.

Thus, the zero-th input element x(0) is stored in the zero-th memory address, as shown in FIG. 1.

The following input elements are successively stored in the first and the second data memories 11 and 12 by repeating operations similar to those described in conjunction with the first through fourth steps.

However, it is to be noted here that bit-reverse operation related to the first through seventh input elements x(1) to x(7) is somewhat different from that related to the zeroth input element x(0). Therefore, description will be made about the bit-reverse operation related to the first through seventh input elements x(1) to x(7).

When the real part Re{x(1)} of the first input element x(1) is given to the input/output port 50, address calculation is carried out by the use of the first and the second address registers included in the register file 27. On reception of the first input element x(1), the first and the second address registers are kept as their contents at zero and 128 ($=2^7$), respectively, as mentioned before.

The content of the second address register is added to the content of the first address register through the operation bus 28, the selector 25, the barrel shifter 24, and the arithmetic and logic unit 26. A result of the addition has twenty bits and is specified by ten lower significant bits of the result. The result of addition of $2^7$ to zero becomes equal to $2^7$ and is represented by (0010000000) arranged from the ninth bit to the zeroth bit. The result of addition is reversed in bit order by the bit-reversing circuit 33 illustrated in FIG. 6 and is rearranged into a first bit-reversed address signal (0000000100). The first bit-reversed address signal may be recognized as four and is sent through the bit-restriction circuit 34 and the data bus 40 to the first index register 311.

Under the circumstances, the real part Re{x(1)} of the first input element x(1) is stored in the fourth memory address of the first data memory 11.

After storage of the real part Re{x(1)}, the first bit-reversed address signal is transferred from the first index register 311 to the second index register 321 through the data bus 40 when the imaginary part Im{x(1)} of the first input element x(1) is supplied to the input/output port 50. Consequently, the first imaginary part Im{x(1)} of the first input element x(1) is stored in the fourth memory address of the second data memory 12.

Thus, the real and the imaginary parts Re{x(1)} and Im{x(1)} are stored in the fourth memory addresses of the first and the second data memories 11 and 12 as described in FIG. 1.

Thereafter, the content ($=2^7$) of the second address register is added to the content ($=2^7$) of the first address register to calculate a sum of both contents on reception of the real part Re{x(2)} of the second input element x(2). As a result, the sum of both contents has ten lower significant bits represented by $2^8$, (0100000000) and is reversed in bit order into a second bit-reversed address signal (0000000010) by the bit-reversing circuit 33. The second bit-reversed address signal is recognized as two and is delivered through the bit-restriction circuit 34 and the data bus 40 to the first index register 311. Accordingly, the real part Re{x(2)} of the second input element x(2) is stored in the second memory address of the first data memory 11. Likewise, the imaginary part Im x(2) of the second input element {x(2)} is stored in the second memory address of the second data memory 12.

Subsequent addition of the content ($=2^8$) of the first address register to the content ($=2^7$) of the second address register becomes equal to (0110000000). The result of addition is rearranged into (0000000110), namely, six. Thus, the real and the imaginary parts Re{x(3)} and Im{x(3)} are stored in the sixth memory addresses of the first and the second data memories 11 and 12.

Similar operation is repeated until the real and the imaginary parts Re{x(7)} and Im{x(7)} are stored in the seventh memory addresses of the first and the second data memories 11 and 12, respectively. This brings about a relationship between the memory addresses and the input elements stored in the memory addresses, as illustrated in the two lefthand columns of FIG. 1.

Next, let the butterfly calculations be carried out for the FFT in the manner exemplified in FIG. 1 after the zero-th through seventh input elements $x(0)$ to $x(7)$ are stored in the data memories 11 and 12. As shown in FIG. 1, the butterfly calculations are made in the first, the second, and the third stages. It is possible to analogize the butterfly calculations of the first stage from those of the second stage. Therefore, description will be directed to the butterfly calculations of the second and the third stages.

Herein, it is to be noted that the zeroth through seventh output elements $X(0)$ to $X(7)$ given from the third stage (FIG. 1) as final results of the FFT are equal to one eighth of normal final results of the FFT because N is equal to eight in Equation (8) and that first and second local results $y_0'$ to $y_7'$ and $z_0'$ to $z_7'$ obtained in the first and the second stages are equal to halves and quarters of first and second normal results which are to be correctly produced from the first and the second stages, respectively. This means that each stage calculates halves of the normal results.

At any rate, each butterfly calculation is carried out in accordance with Equations (6) divided by a factor of two. At the second stage of FIG. 1, the first and the second butterfly calculations of the first butterfly group are made in the first place and are followed by the third and the fourth butterfly calculations of the second butterfly group. As shown in FIG. 1, the twiddle factors $W_8^0$ must be read out of the read-only memory 14 (FIG. 5) in the first and the third butterfly calculations while the twiddle factor $W_8^2$ must be read out of the read-only memory 14 in the second and the fourth butterfly calculations. Each of the twiddle factors $W_8^0$ and $W_8^2$ is divisible into the real and the imaginary parts which are stored in the manner described with reference to FIG. 4. Specifically, the real part $\text{Re}\{W_8^0\}$ of the twiddle factor $W_8^0$ is stored in the zeroth address of the read-only memory 14 while the imaginary part $\text{Im}\{W_8^0\}$ thereof is stored in the first address. On the other hand, the real part $\text{Re}\{W_8^2\}$ of the twiddle factor $W_8^2$ is stored in the fourth address of the read-only memory 14 while the imaginary part $\text{Im}\{W_8^2\}$ is stored in the fifth address. The pointer 15 serves to specify each address of the read-only memory 14 so as to individually read the real and the imaginary parts of each twiddle factor out of the read-only memory 14.

Figure 8:
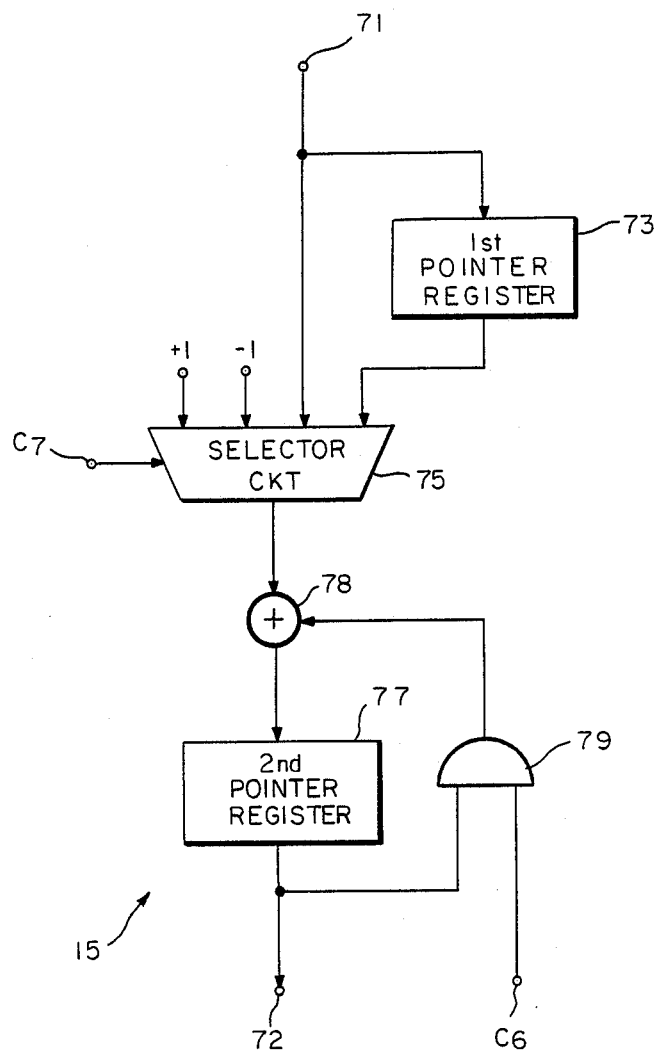
FIG. 8 is a circuit diagram of still another part of the signal processor illustrated in FIG. 5.

Temporarily referring to FIG. 8, the pointer 15 has a pointer input terminal 71 connected to the data bus 40, a pointer output terminal 72 connected to the read-only memory 14, and sixth and seventh control terminals C6 and C7 connected to the controller 55 (FIG. 5). In addition, a first count signal of +1 and a second count signal of −1 are given from the controller 55. The illustrated pointer 15 comprises a first pointer register 73 for keeping a pointer input signal given through the pointer input terminal 71 to produce a register output signal and a selector circuit 75 controlled by the control signal given through the seventh control terminal C7. The selector circuit 75 selects one of the pointer input signal, the register output signal, and the first and the second count signals to produce the selected signal as a selector output signal.

The selector output signal is sent to a second pointer register 77 through an adder 78 connected to an AND gate 79 controlled by the control signal supplied through the sixth control terminal C6. Each of the first and the second pointer registers 73 and 77 may be the same integrated circuit as the first input register 21 shown in FIG. 5. The adder 78 may be the integrated circuit as the first adder 313 shown in FIG. 5. The selector circuit 75 may be an integrated circuit identical with the selector 25 shown in FIG. 5.

When the second pointer register 77 is loaded with the pointer input signal, the pointer input signal is selected as the selector output signal by the selector circuit 75 in response to the control signal given on the seventh control terminal C7. On the other hand, the low level signal (L) is given through the sixth control terminal C6 to close the AND gate 79. Therefore, zero is added to the selector output signal in the adder 78. As a result, the pointer input signal is sent through the selector circuit 75 and the adder 78 to the second pointer register 77 and is produced as a pointer output signal on the pointer output terminal 72.

When the pointer output signal is counted up by one, the first count signal (+1) is selected by the selector circuit 75 in response to the control signal given through the seventh control terminal C7. Simultaneously, the AND gate 79 is enabled by the high level signal supplied from the controller 55 through the sixth control terminal C6. When the second pointer register 77 is eliminated to be loaded with a preceding content, the preceding content of the second pointer register 77 is supplied through the AND gate 79 to the adder 78 in response to the control signal on the sixth control terminal C6. Inasmuch as the adder 78 is supplied with the first count signal (+1), a sum of the preceding content and the first count signal is sent from the adder 78 to the second pointer register 77 and is stored as a present content in the second pointer register 77. Thus, the present content of the second pointer register 77 is produced as the pointer output signal which is equal to the preceding content plus one.

When the pointer output signal is counted down by one, the second count signal (−1) is selected by the selector circuit 75 in response to the control signal given through the seventh control terminal C7. The AND gate 79 is enabled by the control signal supplied through the sixth control terminal C6. Under the circumstances, the adder 78 subtracts one from the preceding content given through the AND gate 79 from the second pointer register 77 to supply a result of subtraction to the second pointer register 77 as the present content. The present content is therefore equal to the preceding content minus one and is produced as the pointer output signal.

It is to be noted here that, on changing the twiddle factor $W_N^0$ to another twiddle factor $W_N^2$, the address for $W_N^0$ is increased or stepped up by a value equal to $2^1$, namely, the first power of two to obtain the address for $W_8^2$. The value may be changed to the zero-th power of two, the second power of two or so and may be referred to a value of two to the power. Such a step-up operation will be called a power step-up of two.

On carrying out the power step-up of two, the first pointer register 73 is loaded through the pointer input terminal 71 with a value of two to the power which may be represented by $2^n$. The value of $2^n$ is selected by the selector circuit 75 in response to the control signal given through the seventh control terminal C7 and is delivered to the adder 78. In this case, the preceding content of the second pointer register 77 is sent to the adder 78 through the AND gate 79 enabled by the control signal. Accordingly, a sum of the preceding content and the value of $2^n$ is produced by the adder 78 to be stored in the second pointer register 77 as the present content. The present content is supplied as the pointer output signal to the pointer output terminal 72.

Referring back to FIG. 5 together with FIG. 1, the first through fourth butterfly calculations of the second stage are assumed to be processed by using the read-only memory 14 and the pointer 15 which are illustrated in FIG. 4 and 8, respectively, together with the bit-reversing circuit 33 and the bit-restriction circuit 34 illustrated in FIGS. 6 and 7, respectively.

On each butterfly calculation, the bit-reversing circuit 33 is put into a normal mode wherein the ten lower bits are not reversed in bit order while the bit-restriction circuit 34 selects ten upper bits of the single precision bit length. In an initial state, the pointer 15 supplies the read-only memory 14 with zero as the pointer output signal. Furthermore, each of the first and the second index registers 311 and 321 is loaded with zero while each of the first and the second base registers 312 and 322 is loaded with two.

As shown in FIG. 1, the first butterfly calculation of the second stage needs the stored data $y_0'$ and $y_2'$ stored in the zeroth and the second memory addresses of each of the first and the second data memories 11 and 12. The stored data $y_2'$ must be multiplied by the twiddle factor $W_8^0$ stored in the read-only memory 14.

At a first step of the butterfly calculation, processing is made to calculate the second term on the righthand side of the first and the third ones of Equations (6). For this purpose, the content (0) of the first index register 311 and the content (2) of the first base register 312 is added by the first adder 313 to obtain a result of addition which is equal to two. The first data memory 11 is accessed by the result of addition to read the real part $Re\{y_2'\}$ of the stored data $y_2'$ out of the second memory address. The real part $Re\{y_2'\}$ is directly stored into the first input register 21 without passing through the data bus 40. Concurrently, the read-only memory 14 is accessed by the pointer output signal (0) of the pointer 15 to read the real parts $Re\{W_8^0\}$ of the twiddle factor $W_8^0$ out of the zero-th address of the read-only memory 14. The real part $Re\{W_8^0\}$ is transferred through the data bus 40 to the second input register 22.

Subsequently, the pointer 15 is counted up by one in the manner described in FIG. 8 and the second pointer register 77 is loaded with "1" to specify the first address of the read-only memory 14 for $Im\{W_8^0\}$.

Thereafter, the first step of butterfly calculation proceeds to a second step at which the multiplier 23 multiplies the content of the first input register 21 by the content of the second input register 22 to produce a product of $Re\{y_2'\}$ and $Re\{W_8^0\}$ which has the double precision bit length and which may be referred to as a first product. The first product is sent through the selector 25 to the barrel shifter 24. In this situation, the barrel shifter 24 is indicated by the controller 55 to shift a shifter input signal by two bits downwards.

Therefore, the first product which is given to the barrel shifter 24 as the shifter input signal is shifted down by two bits into a first shifted product which is equal to a quarter of the first product. The first shifted product is sent through the arithmetic and logic unit 26 to the register file 27.

The register file 27 comprises a first accumulation register for accumulation of real parts, a second accumulation register for accumulation of imaginary parts, and first through fourth data registers, in addition to the first and the second address registers described before.

In the register file 27, the first shifted product is kept in the first accumulation register.

The read-only memory 14 is thereafter accessed by the content (1) of the pointer 15 to read the imaginary part $Im\{W_8^0\}$ out of the first address. The imaginary part $Im\{W_8^0\}$ is delivered through the data bus 40 to the first input register 21. On the other hand, the second data memory 12 is accessed by a result of addition between the content (0) of the second index register 321 and the content (2) of the second base register 322. As a result, the imaginary part $Im\{y_2'\}$ is read out of the second memory address of the second data memory 12 and is stored through a specific bus into the second input register 22.

A third step of butterfly calculation follows the second step to calculate the third term on the righthand side of the first one of Equations (6). To this end, a product of $Im\{W_8^0\}$ and $Im\{y_2'\}$ stored in the first and the second input registers 21 and 22 is calculated by the multiplier 23 and may be called a second product. The second product is sent to the barrel shifter 24 through the selector 25 to be shifted by two bits into a second shifted product. As a result, the second shifter product is equal to one fourth of the second product.

Thereafter, the arithmetic and logic unit 26 subtracts the second shifted product from the first shifted product stored in the first accumulation register to produce a result of subtraction which is given by:

$$\tfrac{1}{4}[Re\{W_8^0\}Re\{y_2'\} - Im\{W_8^0\}Im\{y_2'\}].$$

Concurrently, the imaginary part $Im\{W_8^0\}$ of $W_8^0$ is again read out of the read-only memory like in the second step and is transferred through the data bus 40 to the second input register 22. On the other hand, the first data memory 1 is accessed by the sum (2) of the content (0) of the first index register 311 and the content (2) of the first base register 312 to read the real part $Re\{y_2'\}$ out of the second address. The real part $Re\{y_2'\}$ is sent to the first input register 21 in the above-mentioned manner. Thereafter, the pointer 15 is counted down by one by selecting the second count signal ($-1$) so as to access the zeroth address of the read-only memory 14 and to read the real part $\{W_8^0\}$ out of the read-only memory 14.

Subsequently, the third step is followed by a fourth step at which the multiplier 23 calculates a third product of $Im\{W_8^0\}$ and $Re\{y_2'\}$ stored in the second and the first input registers 22 and 21. The third product has the double precision bit length and is processed in the above-mentioned manner through the selector 25 and the barrel shifter 24. As a result, a third shifted product is stored in the second accumulation register through the arithmetic and logic unit 26.

Simultaneously, the real part $Re\{W_8^0\}$ of $W_8^0$ is read out of the read-only memory 14 under control of the pointer 15 and is stored through the data bus 40 into the first input register 21. On the other hand, the second input register 22 is loaded with the imaginary part $Im\{y_2'\}$ resulting from the second memory address of the second data memory 12.

At a fifth step following the fourth step, a fourth product of $Re\{W_8^0\}$ and $Im\{y_2'\}$ stored in the first and the second input registers 21 and 22 is calculated by the multiplier 23 in a like manner and is sent through the selector 25 and the barrel shifter 24 to the arithmetic and logic unit 26 as a fourth shifted product $\frac{1}{4}$ Im$\{y_2'\}$Re$\{W_8^0\}$. The arithmetic and logic unit 26 adds the fourth shifted product to the third shifted product stored in the second accumulation register to produce a result of addition which is represented by:

$$\tfrac{1}{4}[\text{Im}\{W_8^0\}\text{Re}\{y_2'\}+\text{Re}\{W_8^0\}\text{Im}\{y_2'\}].$$

The result of addition is stored in the second accumulation register. Thus, calculation is carried out in connection with the second and the third terms on the right-hand side of the second one of Equations (6).

The fifth step is succeeded by a sixth step at which the first data memory 11 is accessed by the content (0) of the first index register 311 to read the real part Re$\{y_0'\}$ out of the zero-th memory address. The real part Re$\{y_0'\}$ is directly sent through an exclusive line to the selector 25 to be changed to a bit signal of the double precision bit length by adding ten lower bits of zero. Thereafter, the bit signal is shifted down by two bits into a shifted bit signal which is representative of $\frac{1}{4}$ Re$\{y_0'\}$. The shifted bit signal is added by the arithmetic and logic unit 26 to that content of the first accumulation register which is given by:

$$\tfrac{1}{4}[\text{Re}\{y_2'\}\text{Re}\{W_8^0\}-\text{Im}\{y_2'\}\text{Im}\{W_8^0\}].$$

A result of the above addition may be called a first result and is therefore equal to:

$$\tfrac{1}{4}[\text{Re}\{y_0'\}+\text{Re}\{y_2'\}\text{Re}\{W_8^0\}-\text{Im}\{y_2'\}\text{Im}\{W_8^0\}].$$

The first result is stored in the first data register included in the register file 27. Thus, the first one of Equations (6) is calculated although the stored result is divided by a factor of four.

At a seventh step following the sixth step, the second data memory 12 is accessed by the content (0) of the second index register 321 to read the imaginary part Im$\{y_0'\}$ out of the zero-th address. The imaginary part Im$\{y_0'\}$ is processed through the selector 25 and the barrel shifter 24 in a manner similar to the real part Re$\{y_0'\}$ and is added to the content of the second accumulation register to produce a sum which may be called a second result and which is represented by:

$$\tfrac{1}{4}[\text{Im}\{y_0'\}+\text{Im}\{y_2'\}\text{Re}\{W_8^0\}+\text{Re}\{y_2'\}\text{Im}\{W_8^0\}].$$

The second result is equal to a quarter of the second one of Equations (6) and is stored in the second data register of the register file 27.

The seventh step is succeeded by an eighth step for calculating the third one of Equations (6). At the eighth step, the first data memory 11 is accessed by the content (0) of the first index register 311 to read the real part Re$\{y_0'\}$ out of the zero-th memory address. The real part Re$\{y_0'\}$ is processed through the selector 25 and the barrel shifter 24 in the above-mentioned manner to the arithmetic and logic unit 26 as a shifted real part of $\frac{1}{4}$ Re$\{y_0'\}$.

The content of the first accumulation register is subtracted by the arithmetic and logic unit 26 from the shifted real part. In this situation, the first accumulation register is loaded as its content with a difference between the first and the second products. Therefore, subtraction of the content of the first accumulation register from the shifted real part results in:

$$\tfrac{1}{4}[\text{Re}\{y_0'\}-\text{Re}\{y_2'\}\text{Re}\{W_8^0\}+\text{Im}\{y_2'\}\text{Im}\{W_8^0\}]$$

and may be called a third result. The third result is equal to the third one of Equations (6) divided by the factor of four and is stored in the third data register.

At a ninth step, the imaginary part Im$\{y_0'\}$ is read out of the zero-th memory address of the second data memory 12 under control of the second index register 321, as is the case with the seventh step. The imaginary part Im$\{y_0'\}$ is processed in the above-mentioned manner and is given as a shifted imaginary part of $\frac{1}{4}$ Im$\{y_0'\}$ to the arithmetic and logic unit 26. As a result, the content of the second accumulation register is subtracted from the shifted imaginary part. Inasmuch as content of the second accumulation register is equal to a sum of the third and the fourth product, subtraction of the content of the second accumulation register from the shifted imaginary part $\frac{1}{4}$ Im$\{y_0'\}$ results in:

$$\tfrac{1}{4}[\text{Im}\{y_0'\}-\text{Re}\{W_8^0\}\text{Im}\{y_2'\}-\text{Im}\{W_8^0\}\text{Re}\{y_2'\}]$$

and may be called a fourth result. The fourth result is equal to the fourth one of Equations (6) divided by four and is stored in the fourth data register.

Next, four steps are carried out to further process the first through fourth results stored in the first through fourth data registers, respectively. More particularly, the first through fourth results are sent from the first through fourth data registers to the barrel shifter 24 through the operation bus 28 and the selector 25 to be shifted by one bit upwards into first through fourth shifted results at the respective steps. The first through fourth shifted results are equal to halves of Equations (6) and may be said as correct results of the FFT when scaling of calculation is considered.

The four following steps are for storing the first through fourth shifted results into the first and the second data memories 11 and 12. At each step, each shifted result is sent through the operation bus 28, the bit-reversing circuit 33, and the bit-restriction circuit 34, and the data bus 40 to the first and the second data memories 11 and 12.

The first shifted result is stored in the first data memory 11 accessed by the first index register 311 while the second shifted result is stored in the second data memory 12 accessed by the second index register 312. The third shifted result is stored in the first data memory 11 in accordance with a result of addition between the contents of the first index register 311 and the first base register 312. The fourth shifted result is stored in the second data memory 12 in accordance with a result of addition between the contents of the second index register 321 and the second base register 322.

Thus, the first butterfly calculation of the second stage (FIG. 1) is finished and is followed by the second butterfly calculation of the second stage which is carried out by using the memorized data $y_1'$ and $y_3'$ and the twiddle factor $W_8^2$. This means that each of the first and the second index registers 311 and 321 must be counted up by one and that the twiddle factor $W_8^0$ must be changed to the twiddle factor $W_8^2$. In this case, the address distance stored in each of the first and the second base registers 312 and 322 is kept unchanged.

For this purpose, an additional step is added before the second butterfly calculation of the second stage so as to count up each of the first and the second index registers 311 and 321 by $+1$. In this situation, the first and the second index registers 311 and 321 can access the first memory addresses of the first and the second data memories 11 and 12, respectively. Each of the first and the second adders 313 and 323 adds the content (1) of each index register 311 and 321 to the content (2) of each base register 312 and 322 to produce a result of addition equal to three. Therefore, the third memory addresses of the first and the second data memories 11 and 12 are accessed by the first and the second adders 313 and 323 to read the real and the imaginary parts Re{y3'} and Im{y3'}, respectively.

In addition, the pointer 15 carries out the power step-up of two as mentioned before is stepped up by two to the second power, namely, $2^2$ because the real part Re{$W_8^2$} of $W_8^2$ is stored in the fourth address of the read-only memory 14, as understood from FIG. 4.

After the additional step, the second butterfly calculation is carried out from the first step in a manner similar to that described in conjunction with the first butterfly calculation. Thus, the first and the second data memories 11 and 12 and the read-only memory 14 are accessed by indirect addressing by using the first and the second index registers 311 and 321, the first and the second base registers 312 and 322, and the pointer 15.

When the first and the second butterfly calculations of the first butterfly group are completed in the second stage, processing proceeds to the second butterfly group which is composed of the third and the fourth butterfly calculations. The third butterfly calculation can be carried out like the first butterfly calculation mentioned before except that the memorized data $y_4'$ and $y_6'$ must be read out of the fourth and the sixth memory addresses.

Inasmuch as the third butterfly calculation follows the second butterfly calculation, the twiddle factor $W_8^0$ in the third butterfly calculation must be substituted for the twiddle factor $W_8^2$ used in the second butterfly calculation. Furthermore, each content of the first and the second index registers 311 and 312 should be changed from unity to four to specify the fourth memory address for the memorized data $y_4'$.

To this end, first and second subsidiary steps are added to the third butterfly calculation in addition to the steps described in conjunction with the first butterfly calculation. At the first subsidiary step, the content (1) of each of the first and the second index registers 311 and 321 is added to the content (2) of each of the first and the second base registers 312 and 322. The result of addition therefore becomes equal to three and is stored in each of the first and the second index registers 311 and 321.

On the other hand, the pointer 15 is set into zero at the first subsidiary step so as to read the twiddle factor $W_8^0$.

At the second subsidiary step, the first and the second index registers 311 and 321 are incremented by +1 to specify the fourth memory address of the first and the second data memories 11 and 12.

The second subsidiary step is followed by the first step to carry out the third butterfly calculation in the manner described in conjunction with the first butterfly calculation. The third butterfly calculation proceeds to the fourth butterfly calculation as is the case with transition from the first butterfly calculation to the second butterfly calculation.

At any rate, it is to be noted that the address distance is kept unchanged during the second stage and that the first and the second data memories 11 and 12 and the read-only memory 14 are internally accessed during the second stage. Therefore, it is unnecessary to supply any address from an external device to the signal processor during the second stage.

After completion of the fourth butterfly calculation in the second stage, processing should be shifted from the second stage to the third stage. In this event, the address distance must be changed from two to four and four of the twiddle factors $W_8^0$, $W_8^1$, $W_8^2$, and $W_8^3$ must be used in the first through fourth additional butterfly calculations of the third stage, as readily understood from FIG. 1. As shown in FIG. 4, the real parts of the four twiddle factors are stored in the read-only memory 14 at every other address as well as the imaginary parts of the four twiddle factors. Accordingly, the real parts of the four twiddle factors can be successively read out of the read-only memory 14 by successively adding $2^1$ to a preceding one of the addresses. An address distance between the addresses for the real and the imaginary parts of each twiddle factor is equal to unity.

Taking the above into consideration, first through third supplemental steps are carried out before the first additional butterfly calculation of the third stage after completion of the fourth or last butterfly calculation of the second stage. More specifically, the first and the second index registers 311 and 321 are loaded with zero at the first supplemental step while the first and the second base registers 312 and 322 are loaded with four at the second supplemental step to indicate the address distance used in the third stage. At the third supplemental step, the pointer 15 is put into a power step-up state to carry out the step-up of $2^1$ and to increment the addresses of the read-only memory 14. Therefore, the number, such as $2^1$, may be named an incremental component.

Thus, the zero-th and the fourth memory addresses are specified at the first and the second supplemental steps to read the memorized data (depicted at $z_0'$ and $z_4'$ in FIG. 1) out of the zero-th and the fourth memory addresses of each of the first and the second data memories 11 and 12. The incremental component is set in the pointer 15 at the third supplemental step. Under the circumstances, the first through fourth additional butterfly calculations of the third stage can be carried out in a manner similar to the first butterfly group of the second step. It is to be recollected that the third stage is composed of the single group, differing from the second stage. Therefore, the first through fourth additional butterfly calculations may be successively carried out four times in a manner similar to the first butterfly group of the second stage.

While this invention has thus far been described in connection with a preferred embodiment thereof, it will readily be possible for those skilled in the art to put this invention into practice in various other manners. For example, the sixth through ninth steps of butterfly calculation may be omitted, if the arithmetic and logic unit 26 has saturation logic such that, on occurrence of an overflow, replacement is made by a maximum value having a polarity identical with an overflow value. In this event, a shift bit number of the barrel shifter 24 may be equal to one bit from the beginning of each butterfly calculation. In addition, data transfer is made between the register file 27 and the first and the second data memories 11 and 12 when processing is shifted from the first butterfly group to the second butterfly group. Such data transfer may be considered as the steps of processing the second butterfly group.

Although description is made only about the FFT, the signal processor may be used to carry out inverse fast Fourier transform. Moreover, bit reverse may be carried out about the output elements X(0) to X(7) instead of the input elements x(0) to x(7). It is needless to say that the number of each of the input elements and the output elements is not restricted to eight but may be greater than eight.

The data processed in the signal processor may have a data length of 24 bits or 32 bits. In this case, each of the first and the second data memories 11 and 12 may store the data which are equal in number to 1024 or so. Therefore, each adder 313 and 323 for accessing the data memories 11 and 12 can specify the data number of 1024 and may be small in size. This means that power consumption is saved in the adders 313 and 323 and that the signal processor consumes low electric power.

What is claimed is:

1. A signal processor for processing zero-th through (N−1)-th input elements of an input data signal into zero-th through (N−1)-th output elements of an output data signal, where N represents a predetermined positive integer, said signal processor comprising a memory unit having a plurality of addresses, memory accessing means for accessing said memory unit to initially store said input elements in the respective memory addresses as stored elements, respectively, coefficient producing means for producing predetermined coefficients, and calculation performing means for performing a predetermined calculation a plurality of times on the stored elements read from said memory means by using said coefficients to generate said output elements as a function of said input elements and said coefficients, each of said stored elements being divided into a real part and an imaginary part, said memory unit comprising a first data memory having said plurality of memory addresses for storing the real parts of said stored elements and a second data memory having said plurality of memory addresses for storing the imaginary parts of said stored elements, said memory accessing means comprising:

a first address circuit coupled to said first data memory for calculating a first address to access the first data memory;

a second address circuit coupled to said second data memory for calculating the first address to access the second data memory;

a first register in cooperation with said first address circuit for indicating an address distance from said first address among said first data memory;

a second register in cooperation with said second address circuit for indicating the address distance from said first address among said second data memory;

a first adder coupled to said first address circuit and said first register for adding the address distance to the first address to supply said first data memory with a second address;

a second adder coupled to said second address circuit and said second register for adding the address distance to the first address to supply said second data memory with the second address;

reading means for reading a pair of stored elements from said first and said second addresses as a pair of read elements;

storing means for storing a pair of calculated elements in said first and said second addresses, said calculated elements being obtained by once performing said predetermined calculation on said pair of read elements;

a first line coupled to said first adder and said first address circuit for delivering said second address to said first address circuit; and a second line coupled to said second adder and said second address circuit for delivering said second address to said second address circuit.

2. A signal processor as claimed in claim 1, wherein said coefficient producing means comprises:

coefficient memory means for storing said coefficients in a plurality of coefficient addresses, respectively;

coefficient address calculating means for calculating one of said coefficient addresses at a time; and coefficient reading means for reading one of said coefficients from said one of the coefficient addresses.

3. A signal processor as claimed in claim 1, wherein:

said calculation performing means comprises a first and a second part, said first part being for initially calculating a provisional address for each of said input elements, said first and said second parts being for performing said predetermined calculation after said input elements are stored in the respective memory addresses;

said memory accessing means further comprising bit reversing means for bit-reversing said provisional address into an input address of said memory addresses;

said storing means being for further storing said each of said input elements in said input address before said first and said second parts are used in performing said predetermined calculation.

4. A signal processor as claimed in claim 1, wherein said zeroth through said (N−1)-th output elements are related to said zeroth through said (N−1)-th input elements by:

$$X(k) = \frac{1}{N} \sum_{i=0}^{N-1} x(i) \cdot W_N^{ik},$$

wherein x(i) represents an i-th input element and X(k) represents a k-th output element, each of i and k being variable from zero to (N−1), and where $W_N^{ik}$ represents each of said predetermined coefficients and is equal to $\exp\{-jik(2\pi/N)\}$, j being representative of an imaginary unit which is equal to $\sqrt{-1}$.

5. A signal processor as claimed in claim 1, wherein said calculation performing means comprises:

a first input register coupled to said first data memory and said coefficient producing means for storing, as a first stored data, either the real part of said read element from said first data memory or one of said predetermined coefficients at a time;

a second input register coupled to said second data memory and said coefficient producing means for storing, as a second stored data, either the imaginary part of said read element from said second data memory or one of said predetermined coefficients at a time;

a multiplier coupled to said first and said second input registers for multiplying said first stored data and said second stored data together to produce a multiplier output signal;

a selector for selecting one of said multiplier output signal, the real part of said read element, the imaginary part of said read element, and a filed data to produce selected data;

a shifter coupled to said selector for shifting said selected data to produce a shifted signal;

an arithmetic and logic unit for carrying out an arithmetic and logic operation on said shifted signal and said filed data to produce an arithmetic output signal; and a register file coupled to said arithmetic and logic unit for filing said arithmetic output signal to produce said filed data.

* * * * *